(12) United States Patent
Wang et al.

(10) Patent No.: US 7,697,626 B2
(45) Date of Patent: Apr. 13, 2010

(54) METHOD AND APPARATUS FOR SELECTING A BEAM COMBINATION IN A MIMO WIRELESS COMMUNICATION SYSTEM

(75) Inventors: Jin Wang, Central Islip, NY (US); Arty Chandra, Manhasset Hills, NY (US); Inhyok Cha, Yardley, PA (US); Yingxue Li, Exton, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 853 days.

(21) Appl. No.: 11/377,152

(22) Filed: Mar. 16, 2006

(65) Prior Publication Data
US 2007/0165736 A1 Jul. 19, 2007

Related U.S. Application Data

(60) Provisional application No. 60/758,672, filed on Jan. 13, 2006.

(51) Int. Cl.
H04L 1/02 (2006.01)
(52) U.S. Cl. .................... 375/267; 375/347
(58) Field of Classification Search ............. 375/267, 375/347, 299; 370/334, 465; 342/359, 360, 342/368; 455/562.1, 25, 63.4
See application file for complete search history.

(56) References Cited

U.S. PATENT DOCUMENTS

| | | | |
|---|---|---|---|
| 6,697,642 B1 * | 2/2004 | Thomas | 455/562.1 |
| 7,327,983 B2 * | 2/2008 | Mehta et al. | 455/63.1 |
| 2003/0123598 A1 * | 7/2003 | Gollamudi et al. | 375/377 |
| 2003/0231706 A1 * | 12/2003 | Hwang | 375/219 |
| 2003/0236080 A1 * | 12/2003 | Kadous et al. | 455/226.1 |
| 2004/0147287 A1 * | 7/2004 | Nelson et al. | 455/561 |
| 2005/0058111 A1 * | 3/2005 | Hung et al. | 370/338 |
| 2006/0023624 A1 * | 2/2006 | Han et al. | 370/204 |
| 2006/0176972 A1 * | 8/2006 | Kim et al. | 375/267 |
| 2007/0160162 A1 * | 7/2007 | Kim et al. | 375/267 |
| 2007/0206695 A1 * | 9/2007 | Ye et al. | 375/267 |
| 2008/0247370 A1 * | 10/2008 | Gu et al. | 370/338 |

OTHER PUBLICATIONS

Syed Aon Mujtaba, IEEE P802.11, TGn Sync Proposal Technical Specification, Agere Systems, Jul. 2005.*
Xinying Zhang Andreas F.Molisach and Sun-Yuan Kung, "Phase-Shift-Based Antenna Selection for MIMO Channels", Mitsubishi Electric Research laboratories, TR2004-072 Dec. 2003).*

* cited by examiner

Primary Examiner—Chieh M Fan
Assistant Examiner—Aristocratis Fotakis
(74) Attorney, Agent, or Firm—Volpe and Koenig, P.C.

(57) ABSTRACT

A method and apparatus for selecting a beam combination of beam switched antennas in a multiple-input multiple-output (MIMO) wireless communication system including a first node and a second node. The first node sends a plurality of modulation and coding scheme (MCS) requests to the second node. Each of the plurality of MCS requests is sent using a particular beam combination. The second node receives the MCS requests and generates MCS feedback signals for each of the MCS requests. Each MCS feedback signal includes an MCS recommendation for the particular beam. The first node selects a beam combination for communicating with the second node based on the MCS recommendations.

24 Claims, 4 Drawing Sheets

METHOD AND APPARATUS FOR SELECTING A BEAM COMBINATION IN A MIMO WIRELESS COMMUNICATION SYSTEM

CROSS REFERENCE TO RELATED APPLICATION

This application claims the benefit of U.S. provisional application No. 60/758,672 filed Jan. 13, 2006, which is incorporated by reference as if fully set forth.

FIELD OF INVENTION

The present invention is related to a wireless communication system. More particularly, the present invention is related to a method and apparatus for selecting a beam combination of beam switched antennas in a multiple-input multiple-output (MIMO) wireless communications system.

BACKGROUND

Among many emerging technologies developed to meet the increasing demand of high speed data transfer, MIMO is one of the most promising technologies. Unlike traditional techniques, such as a diversity technique which tries to mitigate multipaths, MIMO takes advantage of the existence of multipaths.

In a prior art MIMO system, multiple omni-directional antennas are typically placed at a transmitter and a receiver. To improve the MIMO system performance, multiple beam switched subscriber based smart antennas (SBSAs) are provided to replace omni-directional antennas at the transmitter, receiver, or both. The beam switched SBSAs may be switched parasitic antennas (SPAs), such as Trident or Delta type antennas, or phase-shift based beam selection antennas, such as those using a Butler matrix or a fast Fourier transform (FFT) matrix.

To support SBSA MIMO, physical layer information, such as a signal-to-noise ratio (SNR) and channel state information (CSI) is available. Even though this information is accessible from the physical layer, it requires internal bandwidth to exchange this information between the physical layer and a medium access control (MAC) layer. Therefore, it is desirable to use some explicit information at the MAC layer to support the beam selection in the SBSA MIMO system.

SUMMARY

The present invention is related to a method and apparatus for selecting a beam combination of beam switched antennas in a MIMO wireless communication system including a first node and a second node. The first node sends a plurality of modulation and coding scheme (MCS) requests to the second node. Each of the plurality of MCS requests is sent using a particular beam combination. The second node receives the MCS requests and generates MCS feedback signals for each of the MCS requests. Each MCS feedback signal includes an MCS recommendation for the particular beam. The first node selects a beam combination for communicating with the second node based on the MCS recommendations.

DETAILED DESCRIPTION OF THE PREFERRED EMBODIMENTS

Hereafter, the terminology "wireless transmit/receive unit" (WTRU) includes but is not limited to a user equipment, a mobile station, a fixed or mobile subscriber unit, a pager, or any other type of device capable of operating in a wireless environment. When referred to hereafter, the terminology "access point (AP)" includes but is not limited to a Node-B, a site controller, a base station or any other type of interfacing device in a wireless environment.

The features of the present invention may be incorporated into an integrated circuit (IC) or be configured in a circuit comprising a multitude of interconnecting components.

In accordance with the present invention, the wireless communication system includes two nodes and at least one of the nodes includes multiple switched beam antennas.

Figure 1:
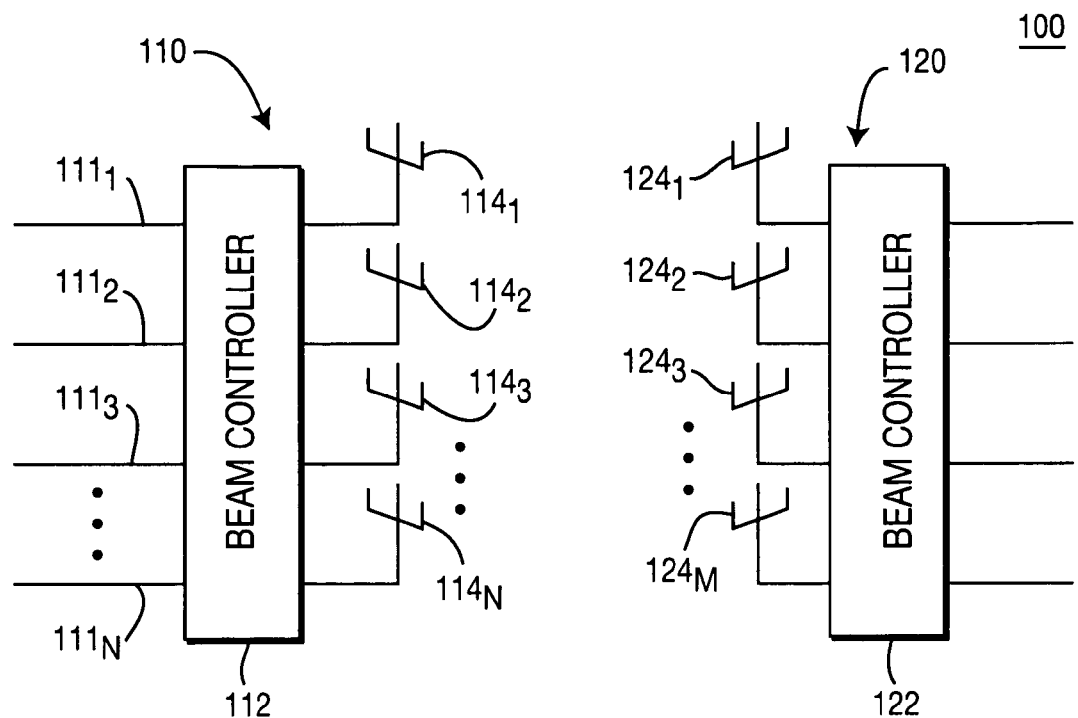
FIG. 1 is a block diagram of an SBSA MIMO system using SPAs.

FIG. 1 shows an SBSA MIMO system 100 including two nodes 110, 120. Each node 110, 120 includes a beam controller 112, 122 and a plurality of SPAs $114_1$-$114_N$, $124_1$-$124_N$. The beam controllers 112, 122 select a beam combination of the beams by selecting at least one beam from each of the SPAs $114_1$-$114_N$, $124_1$-$124_N$. One beam or a subset of beams of each of the SPAs $114_1$-$114_N$, $124_1$-$124_N$ is activated in accordance with a control signal from the beam controller 112. The node 110 maps multiple data streams $111_1$-$111_N$ to the SPAs $114_1$-$114_N$ and transmits the data streams $111_1$-$111_N$ via the selected beam combination.

Figure 2:
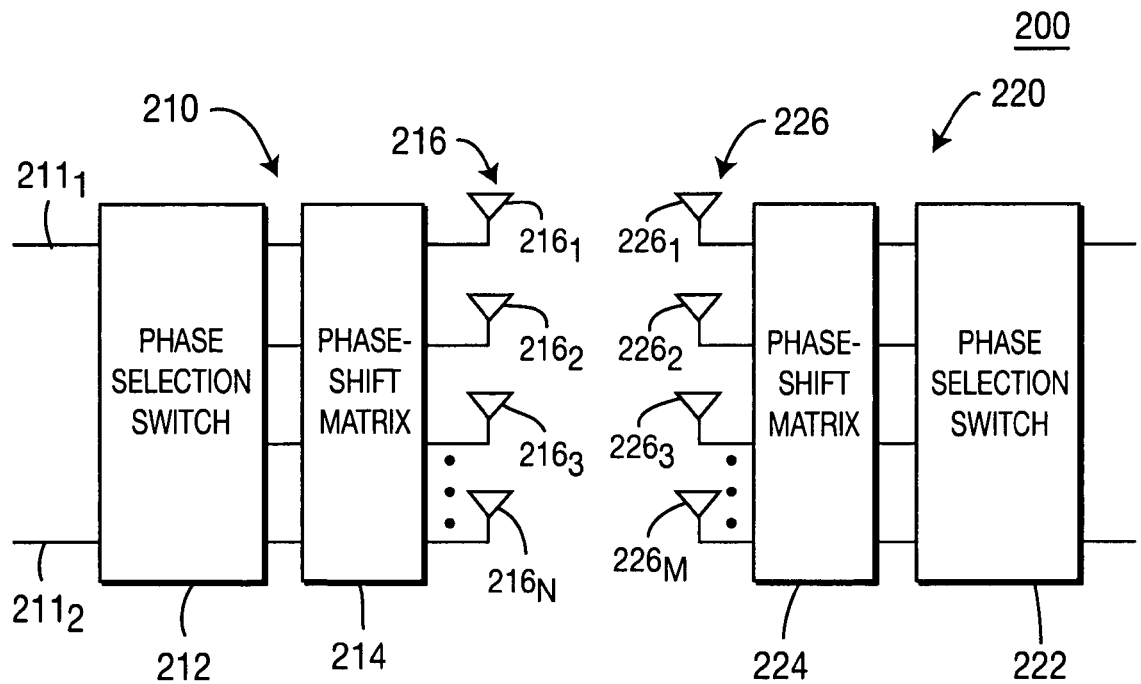
FIG. 2 is a block diagram of an SBSA MIMO system using a phase shift based antenna.

FIG. 2 shows an SBSA MIMO system 200 including two nodes 210, 220. Each node 210, 220 includes a phase selection switch 212, 222, a phase shift matrix 214, 224 and an omni-directional antenna array 216, 226 comprising a plurality of antenna elements $216_1$-$216_N$, $226_1$-$226_N$, respectively. Each of the phase shift matrixes 214, 224 receives input from the respective omni-directional antenna array 216, 226 and forms an output including a plurality of fixed antenna beams. Each node 210, 220 employs the phase selection switch 212, 222 to select a subset of fixed antenna beams for communications between the two nodes 210, 220 upon command and under control of a beam controller (not shown). Input data streams $211_1$, $211_2$ of the node 210 are mapped to one or more of the beams and transmitted using the generated beams in accordance with the activation signal of the phase selection switch 212.

The present invention provides an MCS feedback mechanism which exchanges an MCS request and an MCS feedback signal between the nodes, and the nodes select a beam combination for MIMO communication based on the MCS feedback signal.

Figure 3:
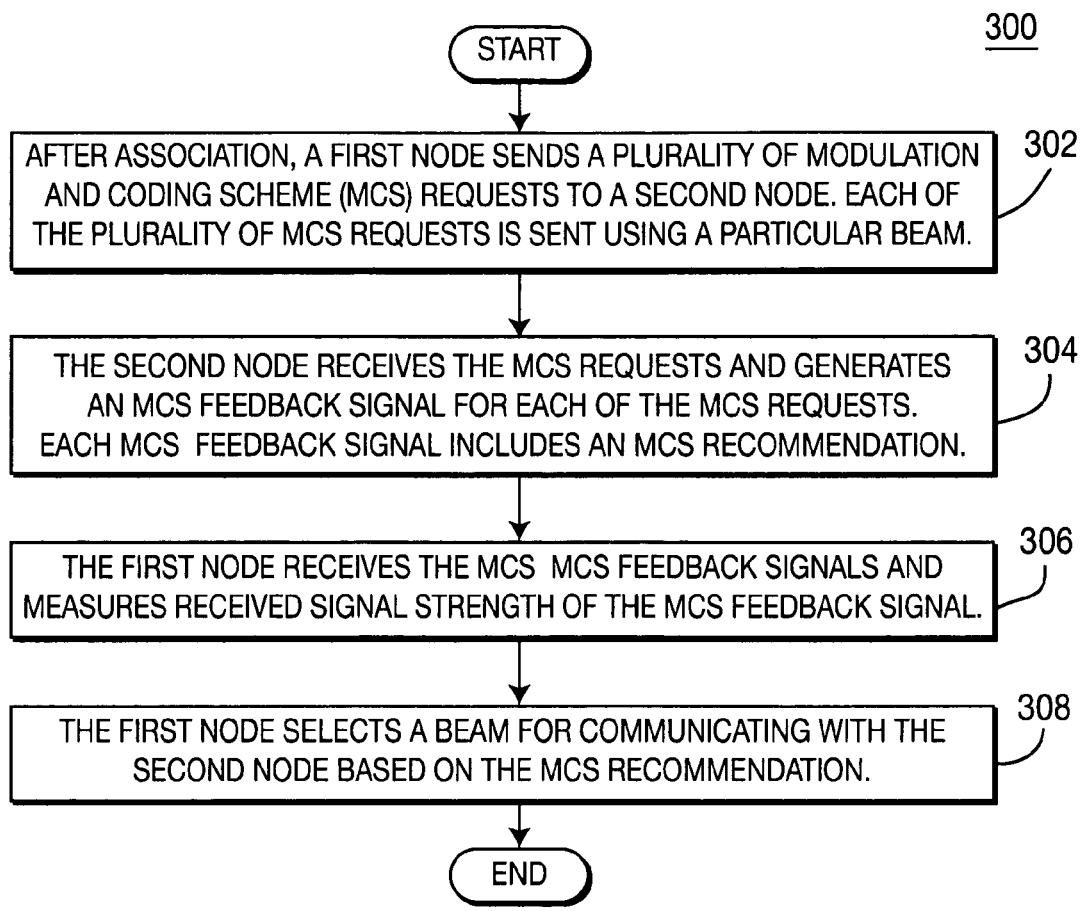
FIG. 3 is a flow diagram of a process for selecting a beam combination in accordance with the present invention.

FIG. 3 is a flow diagram of a process 300 for selecting a beam combination for MIMO in accordance with the present invention. Referring to FIGS. 1-3, a first node 110, 210 sends MCS requests to the second node 120, 220 while switching a beam combination for each MCS request among a plurality of beam combinations generated by switched beam antennas $114_1$-$114_N$, $216_1$-$216_N$ (step 302). The second node 120, 220 receives the MCS requests and generates an MCS feedback signal for each of the MCS requests (step 304). Each MCS feedback signal includes an MCS recommendation for the corresponding beam combination. The MCS recommendation is generated based on several factors, such as a channel condition, a signal-to-noise ratio (SNR), or the like. The first node 110, 210 receives the MCS feedback signals (step 306). The first node 110, 210 then selects a beam combination for communication with the second node 120, 220 based on the MCS recommendations and other factors, (e.g., modulation order, received signal strength indication (RSSI), or the like) (step 308).

The first node 110, 210 may select a beam combination corresponding to the MCS recommendation providing the highest data rate since the MCS leading to the highest data rate implies the best channel and signal condition. If there is more than one MCS recommendation generating the highest data rate, an MCS recommendation having the simplest modulation scheme may be selected. The first node 110, 210 preferably measures an RSSI on the MCS feedback signals. If there is more than one MCS recommendation having the simplest modulation scheme, the first node 110, 210 may select a beam combination associated with the highest RSSI. If there is more than one beam combination associated with the highest RSSI, the first node 110, 210 may select a beam combination with a lowest beam combination number.

The MCS requests and the MCS feedback signals may be exchanged using any signaling mechanism. For example, the MCS requests and the MCS feedback signals may be included in a mode request frame and a mode response frame, which are defined in the IEEE 802.11n standard. Alternatively, the MCS requests and the MCS feedback signals may be exchanged using an initiator aggregation control (IAC) MAC protocol data unit (MPDU) and a responder aggregation control (RAC) MPDU, which are defined in IEEE 802.11 standards. The beam switched antennas can be any type of antennas including, but not limited to, an SPA type, (such as trident and delta antennas) or a phase-shift type, (such as Buttler or FFT matrix based beam selection antenna). The present invention may be applied to selecting only subsets of the antennas.

Figure 4:
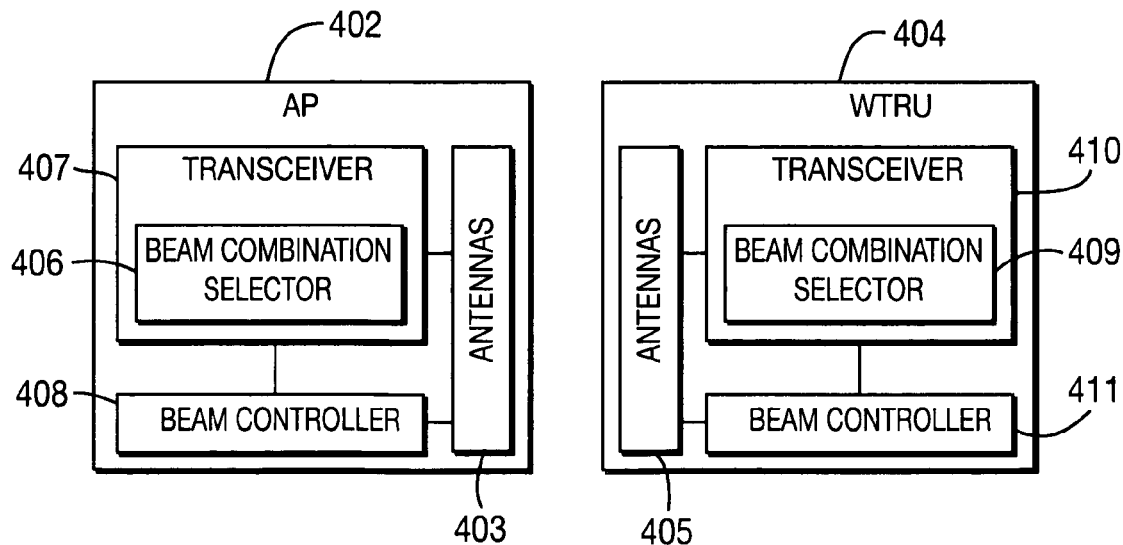
FIG. 4 is a block diagram of a system including an AP and a WTRU having multiple switched beam antennas configured to select a beam combination in accordance with the present invention.

FIG. 4 is a block diagram of a system 400 including an AP 402 and a WTRU 404. The AP 402 may include a switched beam antenna 403, a beam combination selector 406 in a transceiver 407 and a beam controller 408 and the WTRU 404 may also include a switched beam antenna 405, a beam combination selector 409 in a transceiver 410 and a beam controller 411. The switched beam antenna 403, 405 may be an SPA in FIG. 1 or a phased antenna array in FIG. 2. At least one of the WTRU 404 and the AP 402 is configured to select a beam combination in accordance with the present invention. Specific embodiments of the present invention are explained hereinafter with reference to a wireless communication system including the AP 402 and the WTRU 404. The beam combination selectors 406, 409 support medium access control (MAC) layer procedures for beam combination selection which will be described in detail hereinafter.

In accordance with a first embodiment of the present invention, only one of the WTRU 404 and the AP 402 includes switched beam antennas. Assume that antennas 403 are N omni-directional antennas and antennas 405 are M switched beam antennas. The process is basically the same for the case where only the AP 402 includes the switched beam antennas. The number of beam combinations, NUM, is dependent on the type of switched beam antennas to be used. For example, when N trident antennas are used, there are NUM=$3^N$ beam combinations. If two (2) trident antennas are used, there are 9 beam combinations. The MAC layer procedures described hereinafter are to select the most appropriate beam combination among the NUM beam combinations for the data transmission. The MAC layer procedures to support the beam selection in accordance with the present invention reside at both the AP 402 and the WTRU 404.

Figure 5:
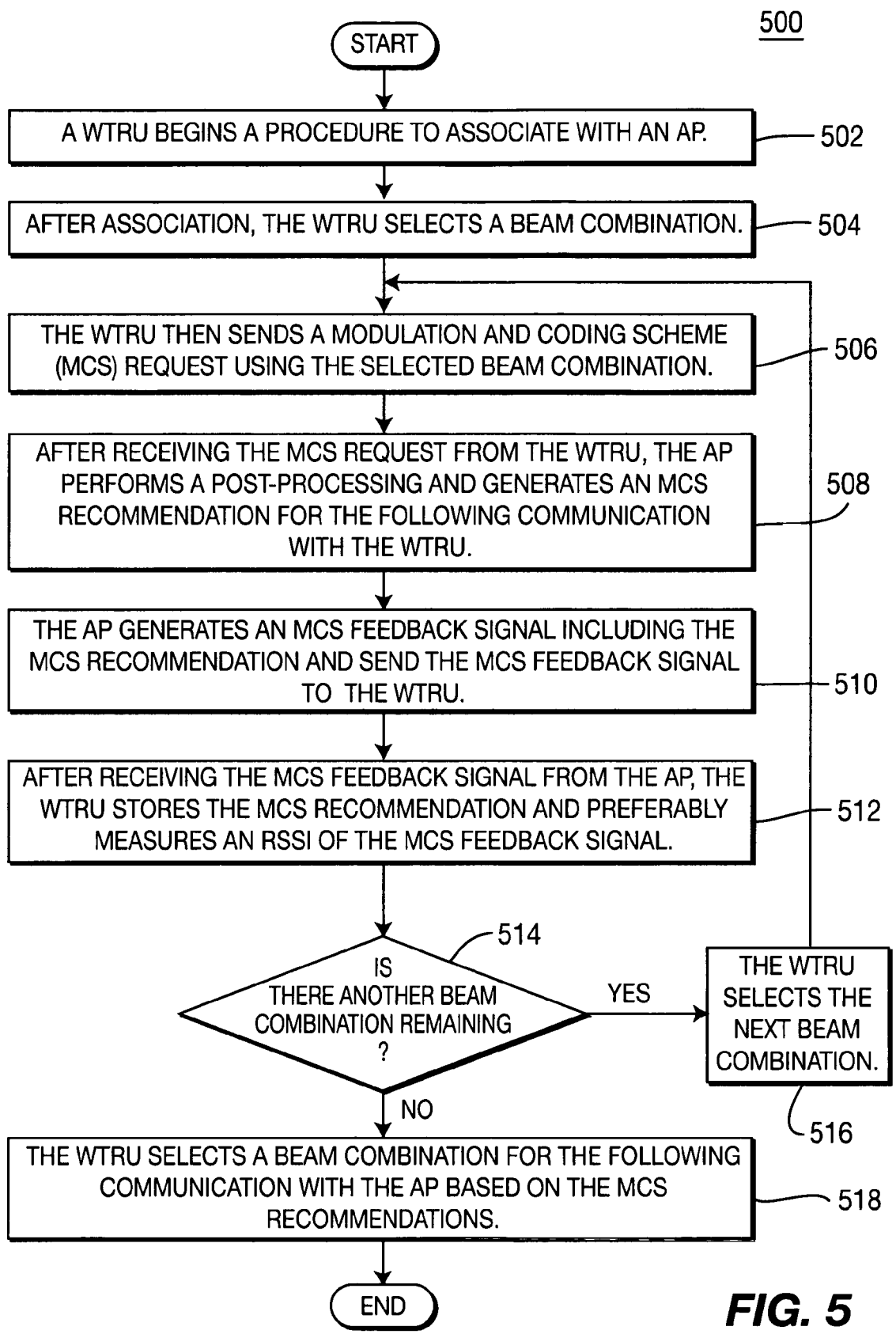
FIG. 5 is a flow diagram of a process for selecting a beam combination in accordance with the first embodiment of the present invention.

FIG. 5 is a flow diagram of a process 500 for selecting a beam in accordance with the first embodiment of the present invention. Whenever a WTRU 404 enters a basic service set (BSS), the WTRU 404 begins a procedure to associate with an AP 402 (step 502). All the handshakes for the association procedure are performed using an omni-mode signal (which may be referred to as "beam combination #0") at both the AP 402 and the WTRU 404. After association, the WTRU 404 selects a beam combination (step 504). The WTRU 404 then sends an MCS request using the selected beam combination (step 506). The MCS request may be sent using a mode request frame, an IAC MPDU, or any other signaling.

After receiving the MCS request from the WTRU 404, the AP 402 performs the post-processing and generates an MCS recommendation for the following communication with the WTRU 404 (step 508). The AP 402 generates an MCS feedback signal including the MCS recommendation and sends the MCS feedback signal to the WTRU 404 (step 510). The MCS feedback signal may be sent using a mode response frame, an RAC MPDU, or any other signaling. After receiving the MCS feedback signal from the AP 402, the WTRU 404 stores the MCS recommendation and preferably measures an RSSI of the MCS feedback signal (step 512).

The WTRU 404 then determines whether there is another beam combination remaining (step 514). If so, the WTRU 404 selects the next beam combination at step 516 and the process 500 returns to step 506. The steps 506-514 are repeated while the WTRU 404 switches the beam combination until all the NUM beam combinations are exhausted. When all the beam combinations are exhausted, the WTRU 404 receives NUM MCS recommendations from the AP 402. The WTRU 404 selects a beam combination for the following communication with the AP 402 based on the MCS recommendations (step 518).

The WTRU 404 preferably selects an MCS recommendation that provides the highest data rate and the beam combination associated with the highest data rate MCS is selected for the following communications with the AP 402. If there are several MCS recommendations providing the highest data rate, the WTRU 404 may select an MCS recommendation with the simplest modulation scheme and corresponding beam combination. If there is still more than one beam combination to be selected, the beam combination with the highest RSSI may be selected. If there is more than one beam combination having the same RSSI, then the beam combination with the lowest beam combination number may be selected. The foregoing description is provided as an example, and any other selection criteria may be used.

The MAC procedure in the first embodiment requires the WTRU 404 and the AP 402 to exchange the same number of messages, (e.g., IAC/RAC MPDUs), as the potential beam combinations. When the number of beam combinations increases due to more beam switched antennas, the procedure will consume a lot of bandwidth. Therefore, for bandwidth efficiency, the WTRU 404 may send NUM MCS requests consecutively while switching beam combinations. The IAC-MPDUs including the MCS requests may be aggregated with other data MPDUs.

When the AP 402 receives each of the MCS requests with different beam combinations from the WTRU 404, the AP 402 decides a proper MCS for each of the beam combinations. However, the AP 402 does not respond to each MCS request, but waits for all MCS requests. After the AP 402 receives all NUM MCS requests, based on the decision of MCS recommendation for each beam combination, the AP 402 sends out an aggregated MCS feedback signal. Each MCS feedback signal includes an MCS recommendation for each beam combination. After the WTRU 404 receives the aggregated MCS feedback signal, the WTRU 404 makes the decision for which beam combination to be chosen as stated hereinabove.

If only the AP 402 includes switched beam antennas, the process is substantially the same as the foregoing process 500. After association, the AP 402 sends MCS requests while switching beam combinations and receives MCS feedback signals from the WTRU 404 and makes a decision on a proper beam combination based on the MCS recommendation made by the WTRU 404. The AP 402 maintains a table for this beam combination selection for the WTRU 404, and updates the table when a link quality between the AP 402 and the WTRU 404 drops below a predetermined threshold.

Alternatively, as explained above, the AP 402 may send NUM MCS requests consecutively while switching beam combinations and the WTRU 404 may send an aggregated MCS feedback signal with NUM MCS recommendations.

In accordance with a second embodiment of the present invention, MAC layer procedures support beam combination selection when switched beam antennas are provided at both the AP 402 and the WTRU 404. The antennas 403 are N switched beam antennas and the antennas 405 are M switched beam antennas. The number of beam combinations at the AP 402 is $NUM_{AP}$ and the number of beam combinations at the WTRU 404 is $NUM_{WTRU}$, which are dependent on the type of switched beam antennas as mentioned hereinabove. The MAC layer procedures in accordance with the present invention is to select the most appropriate beam combination among all beam combinations, ($NUM_{WTRU} \times NUM_{AP}$), for the data transmission at both the AP 402 and the WTRU 404. The MAC layer procedures for MCS request and MCS feedback signal reside at both the AP 402 and the WTRU 404 in order to make the beam selection process work properly.

Figure 6:
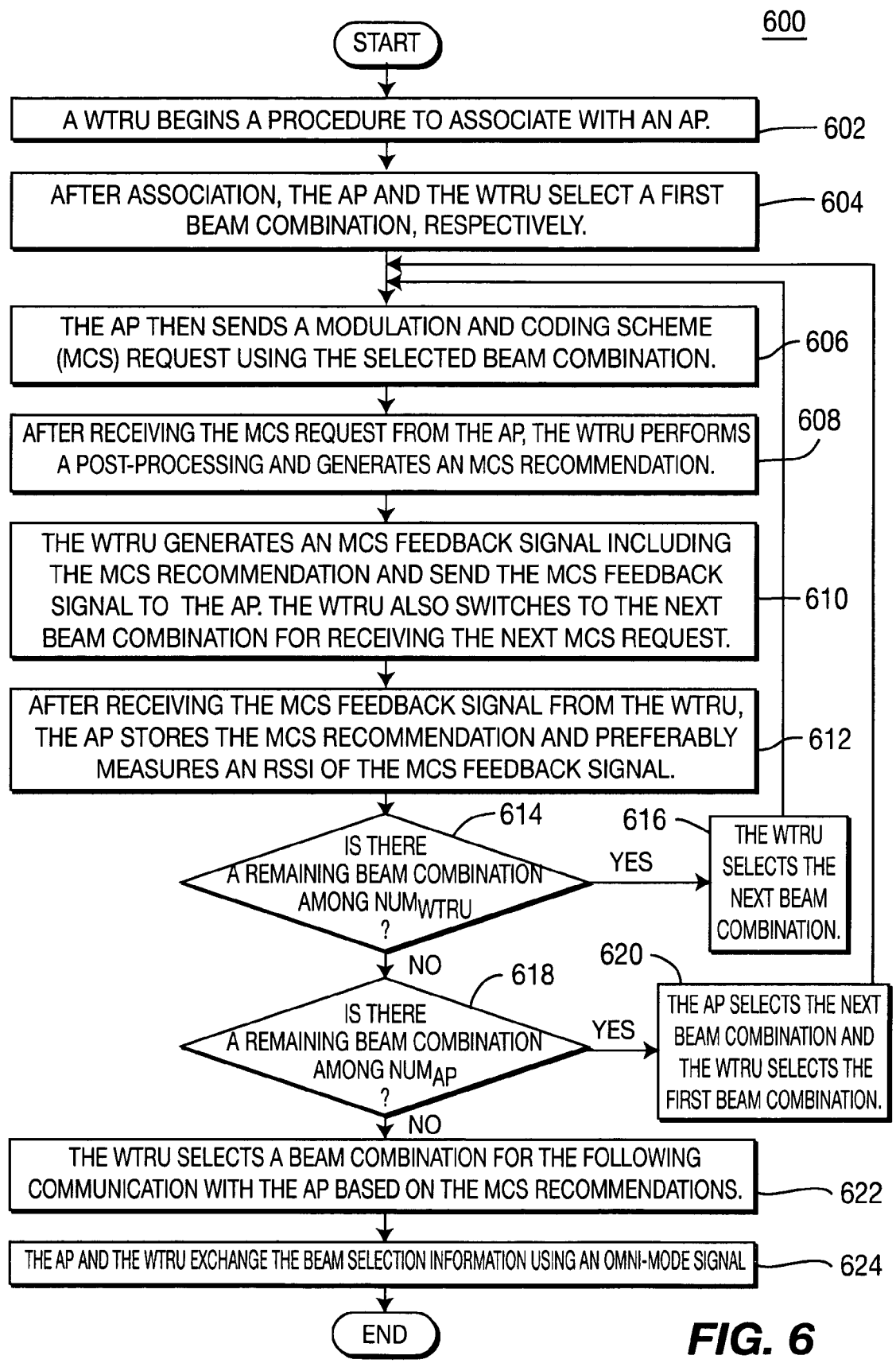
FIG. 6 is a flow diagram of a process for selecting a beam combination in accordance with the second embodiment of the present invention.

FIG. 6 is a flow diagram of a process 600 for selecting a beam combination in accordance with the second embodiment of the present invention. Whenever a WTRU 404 enters a BSS, the WTRU 404 begins a procedure to associate with an AP 402 (step 602). All the handshakes during the association procedure are performed using an omni-mode at both the AP 402 and the WTRU 404.

After association, the AP 402 and the WTRU 404 select a first beam combination, respectively (step 604). The AP 402 then sends an MCS request using the selected beam combination (step 606). After receiving the MCS request from the AP 402, the WTRU 404 performs a post-processing and generates an MCS recommendation for the beam combination, (i.e., the combination of the AP's first beam combination and the WTRU's first beam combination) (step 608). The WTRU 404 then generates an MCS feedback signal including the MCS recommendation and sends the MCS feedback signal to the AP 402 (step 610). After sending out the MCS feedback signal, the WTRU 404 also switches to the next beam combination for the next MCS request reception from the AP 402. After receiving the responded MCS feedback signal from the WTRU 404, the AP 402 stores the MCS recommendation and preferably measures the RSSI on the MCS feedback signal (step 612).

The WTRU and the AP determine whether there is a remaining beam combination among the $NUM_{WTRU}$ beam combinations at the WTRU (step 614). If so, the WTRU selects the next beam combination at step 616 and the process 600 returns to step 606 and the AP and the WTRU repeats the steps 606-614 while the WTRU switches the beam combination until the $NUM_{WTRU}$ beam combinations at the WTRU 404 are exhausted.

If the $NUM_{WTRU}$ beam combinations are exhausted at the WTRU 404, it is determined whether there is a remaining beam combination among $NUM_{AP}$ beam combinations at the AP (step 618). If so, the AP 402 selects the next beam combination and the WTRU 404 selects the first beam combination at step 620 and the process returns to step 606 and the AP 402 and the WTRU 404 repeats steps 606-618 until the $NUM_{AP}$ beam combinations at the AP 402 are exhausted.

After completion, the AP 402 obtains NUM ($NUM_{WTRU} \times NUM_{AP}$) MCS recommendations. Among the NUM MCS recommendations the one leads to the highest data rate is chosen, and the beam combination corresponding to this highest data rate MCS is selected as a preferred beam combination for the following communications between the AP 402 and the WTRU 404 (step 622). The AP 402 and the WTRU 404 exchange the beam selection information using an omni-mode signal at both sides (step 624).

The AP 402 maintains a table for mapping the beam combination to the WTRU 404. The AP 402 updates the table when the link quality between the AP 402 and the WTRU 404 drops below a predetermined threshold.

If there are several MCS recommendations providing the highest data rate, the AP 402 may select an MCS recommendation with the simplest modulation scheme and corresponding beam combination. If there is more than one beam combination to be selected, the beam combination with the highest RSSI may be selected. If both MCS and RSSI are tied up, then the beam combination with the lowest number may be selected. The foregoing description is provided as an example, and any other selection criteria may be used.

Alternatively, for bandwidth efficiency, the AP 402 may send $NUM_{AP}$ MCS requests consecutively while switching beam combinations. During the transmission of all $NUM_{AP}$ MCS requests, the WTRU 404 receives the MCS requests using the first beam combination and does not respond to each MCS request, but waits for all $NUM_{AP}$ MCS requests. The MCS requests may be included in IAC MPDUs, (or mode request frames), and the IAC-MPDUs can be aggregated with other data MPDUs. When the WTRU 404 receives each MCS request from the AP 402, the WTRU 404 decides a proper MCS for each beam combination and stores it. After the WTRU 404 receives all $NUM_{AP}$ MCS requests, based on the decision of MCS recommendation for each beam selection, the WTRU 404 sends out an aggregated MCS feedback signal, (e.g., using an RAC-MPDU or a mode response frame), with $NUM_{AP}$ MCS feedback signals aggregated together using the first beam combination. Each MCS feedback signal has an MCS recommendation for each beam combination. After sending out MCS feedback signals, the WTRU 404 switches to beam combination 2 for the next MCS request reception from the AP 402.

After receiving the MCS feedback signals from the WTRU 404, the AP 402 stores the MCS recommendations and may measure an RSSI on each MCS feedback signal. Then, the AP 402 and the WTRU 404 repeats the previous steps by $NUM_{WTRU}$ times until $NUM_{WTRU}$ beam combinations at the WTRU 404 are exhausted. After completion of the steps, the AP 402 obtains all MCS recommendations from the WTRU 404 and selects a proper beam combination as explained hereinabove.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method for a first node to select a beam combination for communication between the first node and a second node, the method comprising:
   the first node sending a plurality of modulation and coding scheme (MCS) requests to the second node, each of the plurality of MCS requests being sent using a particular beam combination;
   the first node receiving a second-node-generated MCS feedback signal for each of the MCS requests, each MCS feedback signal including an MCS recommendation for the particular beam combination; and
   the first node selecting a beam combination configured to communicate with the second node based on the MCS recommendations;
   the first node measuring a received signal strength indication (RSSI) on each of the MCS feedback signals
   wherein the first node selects the beam combination corresponding to an MCS recommendation providing a highest data rate;
   and on a condition that there is more than one MCS recommendation providing the same highest data rate the first node selects the beam combination corresponding to a simplest MCS recommendation;
   and on a condition that there is more than one MCS recommendation having the same simplest MCS recommendation the first node selects the beam combination corresponding to a highest RSSI;
   and on a condition that there is more than one MCS recommendation corresponding to the same highest RSSI the first node selects a beam combination corresponding to a lowest beam number.

2. The method of claim 1 wherein each MCS feedback signal is received separately after sending the MCS request.

3. The method of claim 1 wherein the first node sends the MCS requests sequentially and receives an aggregate MCS feedback signal including a plurality of MCS recommendations in response to the MCS requests.

4. The method of claim 3 wherein the MCS requests are aggregated with a data packet.

5. The method of claim 1 wherein each of the MCS requests is included in an initiator aggregation control (IAC) medium access control (MAC) protocol data unit (MPDU) and each of the MCS feedback signals is included in a responder aggregation control (RAC) MPDU.

6. The method of claim 1 wherein each of the MCS requests and the MCS feedback signals are transmitted using an IEEE 802.11n mode request frame and an IEEE 802.11n mode response frame, respectively.

7. The method of claim 1 wherein the first node exchanges beam selection information using an omni-mode signal.

8. The method of claim 1 wherein the second node is an access point (AP) and the first node is a wireless transmit/receive unit (WTRU).

9. A wireless communication system comprising a first node and a second node, wherein the first node includes:
   a plurality of antennas, each antenna being configured to generate a plurality of beams such that a beam combination from the antennas is selected;
   a beam controller for activating a beam combination by selecting at least one beam from each of the antennas;
   a first beam combination selector configured to (i) send a plurality of modulation and coding scheme (MCS) requests to the second node using a particular beam combination, (ii) receive MCS feedback signals from the second node, each MCS feedback signal including an MCS recommendation for the particular beam combination, and (iii) select a beam combination for communication with the second node based on the MCS recommendation, and
   wherein the second node includes a second beam combination selector configured to receive the MCS requests and generate the MCS feedback signals for each of the MCS requests;
   wherein the first beam combination selector is configured to select a beam combination corresponding to an MCS recommendation providing a highest data rate;
   and on a condition that there is more than one MCS recommendation providing the same highest data rate the first beam combination selector is configured to select the beam combination corresponding to a simplest MCS recommendation;
   and on a condition that there is more than one MCS recommendation having the same simplest MCS recommendation the first beam combination selector is configured to select the beam combination corresponding to a highest RSSI;
   and on a condition that there is more than one MCS recommendation corresponding to the same highest RSSI the first beam combination selector is configured to select a beam combination corresponding to a lowest beam number.

10. The system of claim 9 wherein the second beam combination selector is configured to send each MCS feedback signal separately after receiving each MCS request.

11. The system of claim 9 wherein the first beam combination selector is configured to send the MCS requests sequentially, and the second beam combination selector is configured to generate an aggregate MCS feedback signal including a plurality of MCS recommendations in response to the MCS requests.

12. The system of claim 11 wherein the second beam combination selector is configured to aggregate the MCS feedbacks in a data packet.

13. The system of claim 9 wherein the first beam combination selector is configured to include each of the MCS requests in an initiator aggregation control (IAC) medium access control (MAC) protocol data unit (MPDU), and the second beam combination selector is configured to include each of the MCS feedback signals in a responder aggregation control (RAC) MPDU.

14. The system of claim 9 wherein the first beam combination selector is configured to transmit each of the MCS requests using an IEEE 802.11n mode request frame, and the second beam combination selector is configured to transmit the MCS feedback signals using an IEEE 802.11n mode response frame.

15. The system of claim 9 wherein the first beam combination selector and the second beam combination selector are configured to exchange beam selection information using an omni-mode signal.

16. The system of claim 9 wherein the second node is an access point (AP) and the first node is a wireless transmit/receive unit (WTRU).

17. A wireless communication system comprising a first node and a second node, wherein the first node includes:
- an antenna array comprising a plurality of omni-directional antennas;
- a phase shift matrix configured to shift a phase of each of the omni-directional antennas to form a plurality of antenna beams;
- a phase selection switch configured to select a beam combination including a subset of the antenna beams for communication with the second node; and
- a first beam combination selector configured to (i) send each of a plurality of modulation and coding scheme (MCS) requests to the second node using a selected beam combination, (ii) receive MCS feedback signals from the second node, each MCS feedback signal including an MCS recommendation for the particular beam combination, and (iii) select a beam combination for communication with the second node based on the MCS recommendation, and
- wherein the second node includes a second beam combination selector configured to receive the MCS requests and generate the MCS feedback signals for each of the MCS requests;
- wherein the first beam combination selector is configured to select a beam combination corresponding to an MCS recommendation providing a highest data rate;
- and on a condition that there is more than one MCS recommendation providing the same highest data rate the first beam combination selector is configured to select the beam combination corresponding to a simplest MCS recommendation;
- and on a condition that there is more than one MCS recommendation having the same simplest MCS recommendation the first beam combination selector is configured to select the beam combination corresponding to a highest RSSI;
- and on a condition that there is more than one MCS recommendation corresponding to the same highest RSSI the first beam combination selector is configured to select a beam combination corresponding to a lowest beam number.

18. The system of claim 17 wherein the second beam combination selector is configured to send each MCS feedback signal separately after receiving each MCS request.

19. The system of claim 17 wherein the first beam combination selector is configured to send the MCS requests sequentially, and the second beam combination selector is configured to generate an aggregate MCS feedback signal including a plurality of MCS recommendations in response to the MCS requests.

20. The system of claim 19 wherein the second beam combination selector is configured to aggregate the MCS feedbacks in a data packet.

21. The system of claim 17 wherein the first beam combination selector is configured to include each of the MCS requests in an initiator aggregation control (IAC) medium access control (MAC) protocol data unit (MPDU), and the second beam combination selector is configured to include each of the MCS feedback signals in a responder aggregation control (RAC) MPDU.

22. The system of claim 17 wherein the first beam combination selector is configured to transmit each of the MCS requests using an IEEE 802.11n mode request frame and the beam combination selector of the second node is configured to transmit the MCS feedback signals using an IEEE 802.11n mode response frame.

23. The system of claim 17 wherein the first beam combination selector and the second beam combination selector are configured to exchange beam selection information using an omni-mode signal.

24. The system of claim 17 wherein the second node is an access point (AP) and the first node is a wireless transmit/receive unit (WTRU).

* * * * *